United States Patent [19]

Mahler

[11] Patent Number: 5,379,890

[45] Date of Patent: * Jan. 10, 1995

[54] JACKET FOR A COMPACT DISC

[75] Inventor: Steven Mahler, Bayside, N.Y.

[73] Assignee: Shorewood Technologies, Inc., Wilmington, Del.

[*] Notice: The portion of the term of this patent subsequent to Feb. 18, 2009 has been disclaimed.

[21] Appl. No.: 796,752

[22] Filed: Jan. 3, 1992

Related U.S. Application Data

[62] Division of Ser. No. 548,225, Jun. 29, 1990, Pat. No. 5,088,599.

[51] Int. Cl.⁶ .............................................. B65D 85/57
[52] U.S. Cl. .................................... 206/310; 206/313
[58] Field of Search ............... 206/307, 309, 310, 312, 206/313, 387, 444, 804; 220/345, 346

[56] References Cited

U.S. PATENT DOCUMENTS

| | | | |
|---|---|---|---|
| 3,288,543 | 11/1966 | Sugerman | 312/12 |
| 4,520,470 | 5/1985 | d'Alayer de Costemore d'Arc | 206/310 |
| 4,771,883 | 9/1988 | Herr et al. | 206/313 |
| 5,000,316 | 3/1991 | Lerner | 312/15 |

FOREIGN PATENT DOCUMENTS 0021009  12/1907  United Kingdom ................ 206/313

Primary Examiner—Jimmy G. Foster
Attorney, Agent, or Firm—Darby & Darby

[57] ABSTRACT

The jacket for a compact disc carrier comprises a generally rectangular space defined by a top panel, bottom panel, two side panels and an end panel. A compact disc carrier is slidable within the space in the direction of the jacket and carrier lengths. Protrusions extending from the jacket into the jacket space engage the carrier near an edge and prevent further motion that would otherwise separate the carrier and jacket when the carrier is being withdrawn from the jacket. The projections from the jacket, which stop the relative motion between the jacket and disc carrier at a predetermined position, are flaps that connect to or near the edges of the top and bottom panels at the open jacket end and extend into the jacket space. The jacket is formed by folding from a single blank of material. In another embodiment the jacket is releasibly connected to a dummy housing to provide an oversized carton for sales and promotional purposes.

2 Claims, 5 Drawing Sheets

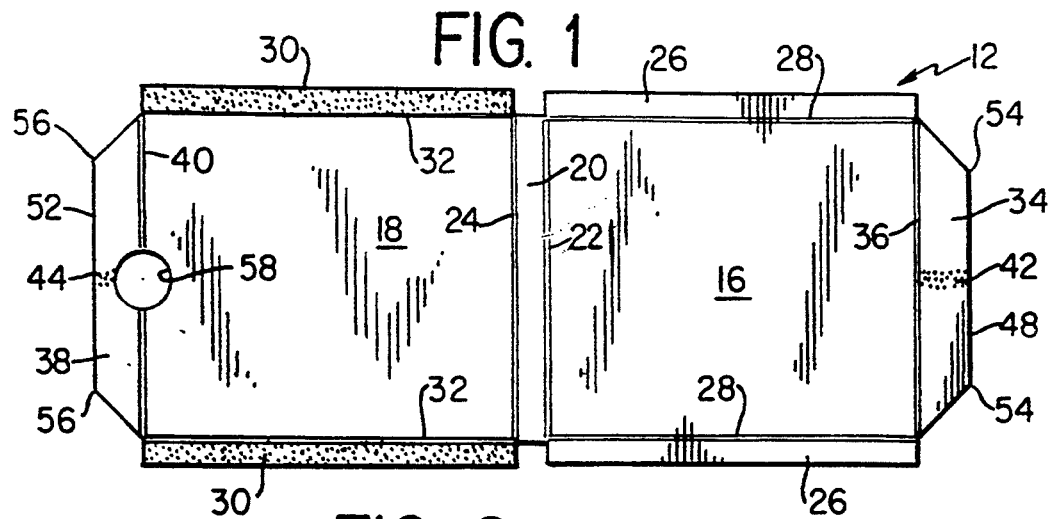

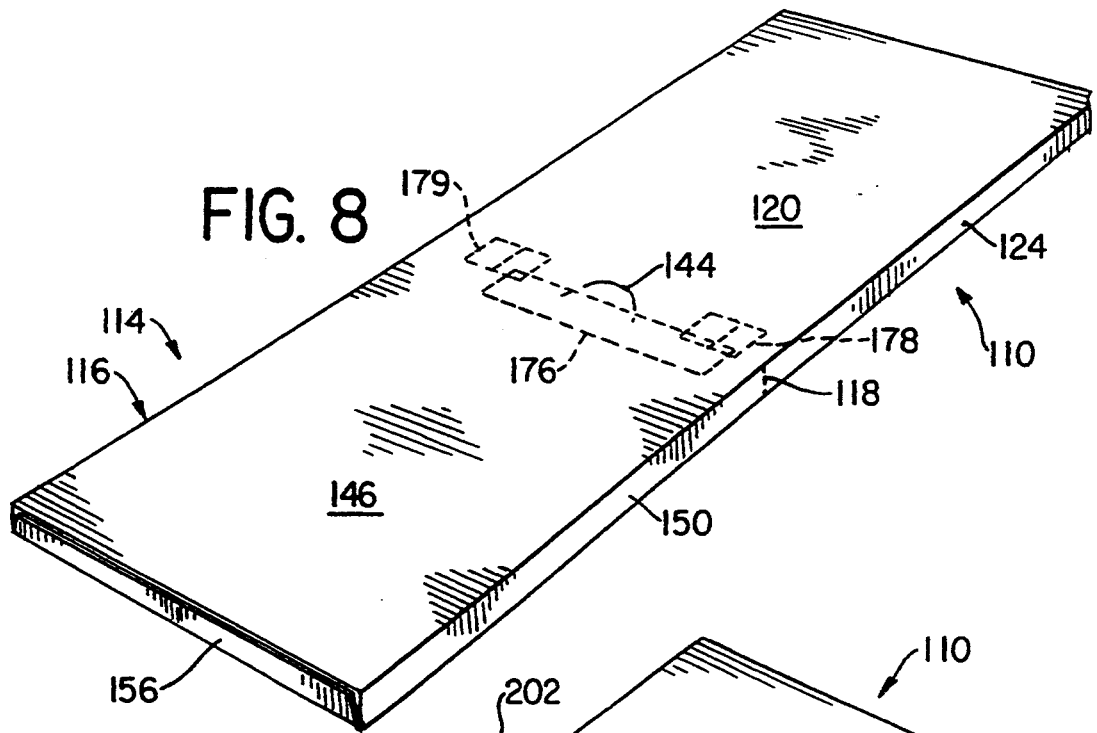
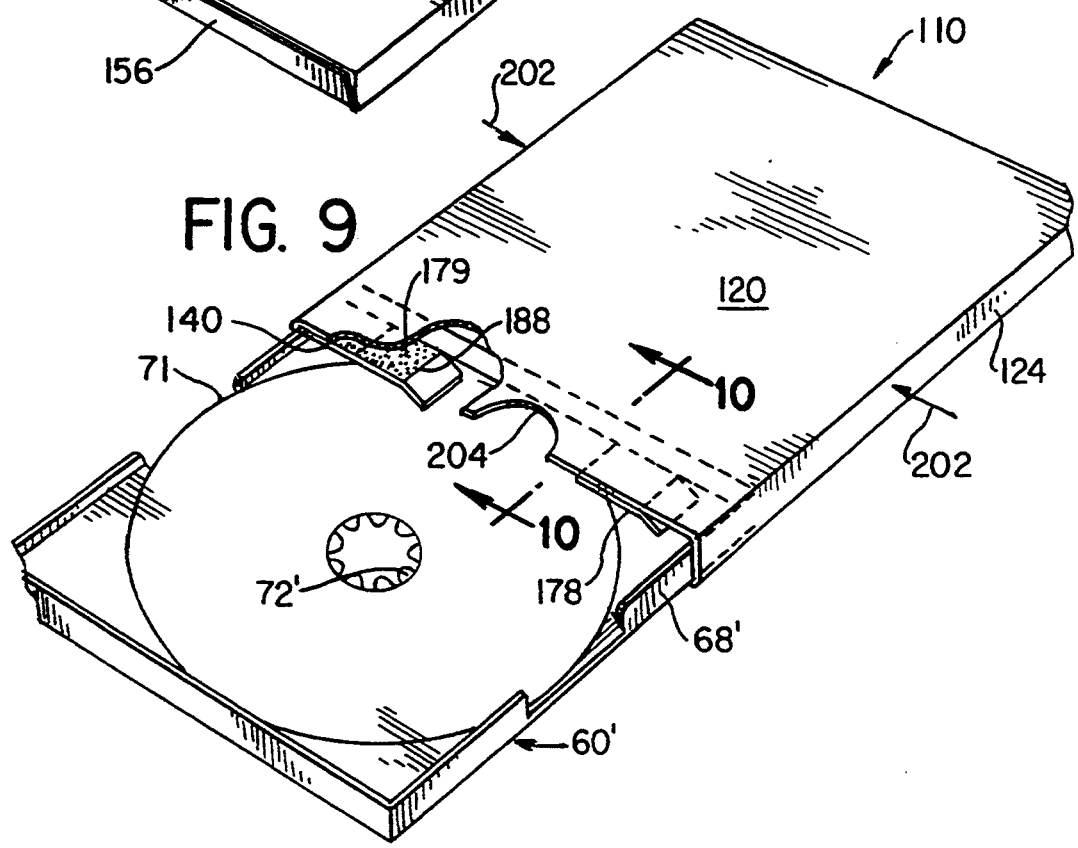

5,379,890

JACKET FOR A COMPACT DISC

This is a continuation, division, of application Ser. No. 548 225, filed Jun. 29, 1990 now Pat. No. 5,088,599.

BACKGROUND OF THE INVENTION

This invention relates generally to holders for compact disc records and more particularly to an improved jacket for use with a conventional compact disc to protect a compact disc during periods of storage, shipment and non-use. With the advent of compact discs, a new format for recording was established and new disc players were introduced substantially simultaneously to enable use at a consumer level of the compact discs. At the outset, the compact discs and playing apparatus were extremely costly as compared to long-playing records and record players then in common use. Further, recorded compact discs were few and expensive in comparison with conventional long-playing records that used conventional turn-table, tone arm, stylus and the like. Because compact discs, having performances by well-known artists recorded thereon, were relatively expensive, good marketing techniques dictated that these discs, which in themselves are quite small as compared to conventional long-playing records, be distinctively and attractively packaged.

A plastic carrier was developed on which the compact disc rested, seated in a recessed surface and gripped by resilient fingers at the center hole of the compact disc. The width and length of the carrier are substantially equal to the compact disc diameter such that at least one edge of the compact disc is accessible to the fingertips. Thereby, the disc may be readily lifted from the central gripping fingers, and from the recessed carrier when it is desired to play the disc in a compact disc player.

The carrier is generally made of plastic that, by its contours, is substantially rigidized, having raised peripheral edges and the circular recess for receiving the disc. For attractive packaging, this carrier is received in a tray and fixedly attached thereto. A cover, hinged at the edge of the tray, pivots over the tray to form a shallow case for the disc carrier, and a single compact disc is held by the carrier. The tray and cover, which form the hinged case, may be of transparent, plastic such that the compact disc is visible within the case. Printed promotional material may be fastened inside the transparent cover to be viewed from outside and may provide information as to the recorded content of the disc. Such hinged plastic cases with carriers for the disc are well known and referred to in the trade as jewel box carriers.

However, many problems are inherent in these jewel box constructions, not the least of which is expense. Moreover, they are difficult to open, break easily, are labor intensive to make and assemble and are prone to crack or striate when dropped. Additionally, you cannot print on the same.

SUMMARY OF THE INVENTION

It is therefore an object of the present invention to provide a packaging, for the disc marketing industry.

It is a further object to provide a sleeve or jacket having an open end into which a compact disc, retained only on a plastic disc carrier, is inserted.

A further object is to provide a jacket, which is generally made from light-weight cardboard, and which may be printed on its external surfaces, providing identification, background and promotional material for the disc.

Yet another object of the invention to provide for a compact disc carrier having an improved jacket that is fabricated of light-weight cardboard and does not separate from the carrier when the disc is removed from the jacket.

Another object of this invention is to provide an improved jacket for a compact disc carrier which is inexpensive to produce.

A further object of this invention is to provide an improved jacket for a compact disc carrier that is readily separable from the carrier or remains joined to the carrier at the user's option.

Yet another object of this invention is to provide an improved jacket for a compact disc carrier that requires little storage space for a compact disc.

Yet another object of this invention is to provide an improved jacket for a compact disc carrier that takes up less space than a conventional hinged carrier case.

A still further object of this invention is to provide an improved carton for a compact disc carrier that discourages merchandise theft and incorporates an improved disc carrier jacket.

In a preferred embodiment of the invention, the jacket for a compact disc carrier comprises a generally rectangular space defined by a top panel, bottom panel, two side panels and an end panel. A compact disc carrier is slidable within the space in the direction of the jacket and carrier lengths. Protrusions extending from the jacket into the jacket space engage the carrier near an edge and prevent further motion that would otherwise separate the carrier and jacket when the carrier is being withdrawn from the jacket. The projections from the jacket, which stop the relative motion between the jacket and disc carrier at a predetermined position, are flaps that connect to or near the edges of the top and bottom panels at the open jacket end and extend into the jacket space, The flaps have resiliency that causes the flaps to extend into the jacket space, except where the flaps are adhered to the respectively adjacent top and bottom panels. The jacket is formed by folding from a single blank of material.

In another embodiment, the jacket is releasibly connected to a dummy housing to provide an oversized carton for purposes of sales and promotion.

The invention accordingly comprises the features of construction, combinations of elements, and arrangements of parts which will be exemplified in the constructions hereinafter set forth, and the scope of the invention will be indicated in the appended claims.

BRIEF DESCRIPTION OF THE DRAWINGS

For a fuller understanding of the invention, reference is made to the following detailed description taken in connection with the accompanying drawings, in which:

FIG. 1 is a blank from which a jacket for a compact disc carrier in accordance with the invention is fabricated;

FIG. 2 is a top perspective view of a jacket for a compact disc carrier in accordance with the invention in a step of assembly from the blank of FIG. 1;

FIG. 3 is a partial elevational view of the jacket in section taken along the line 3—3 of FIG. 4;

FIG. 4 is a top plan view, partially cut away, of the jacket for a compact disc carrier in accordance with the invention showing a compact disc carrier in one operative position;

FIG. 5 is a partial sectional view in elevation, to an enlarged scale, taken along the line 5—5 of FIG. 4;

FIG. 8 is a top perspective view of the assembled carton of FIG. 7;

FIG. 9 is a top perspective view, partially cut away, of the jacket for a compact disc carrier of FIG. 8 in accordance with the invention showing a compact disc carrier in one operative position;

DETAILED DESCRIPTION OF THE PREFERRED EMBODIMENTS

Figure 6:
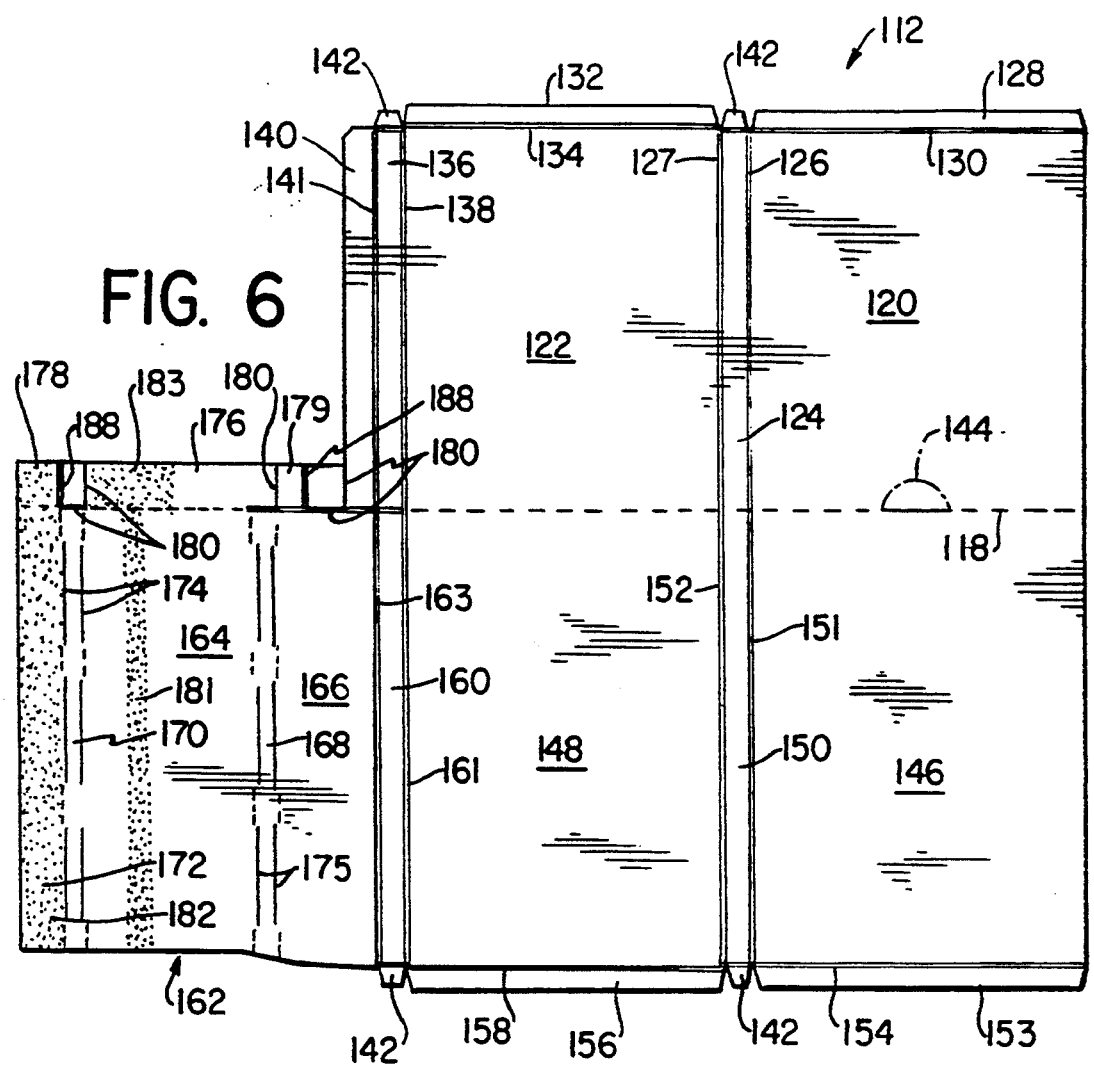
FIG. 6 is a blank from which a carton including a modified embodiment of a jacket for a compact disc carrier in accordance with the invention is fabricated.
Figure 10:
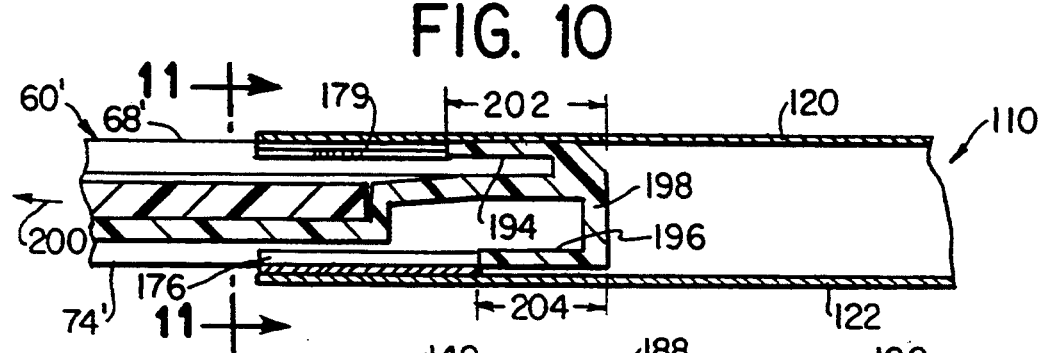
FIG. 10 is a partial sectional view in elevation, to an enlarged scale, taken along the line 10—10 of FIG. 9.
Figure 11:
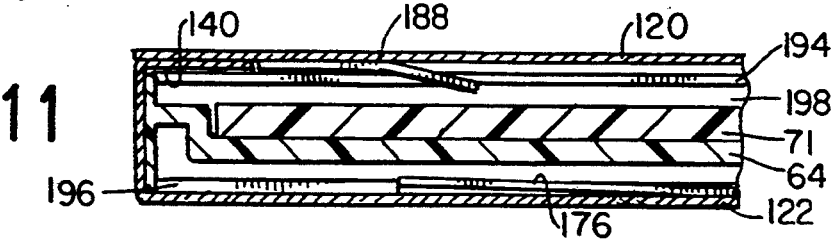
FIG. 11 is a partial sectional view in elevation, to an enlarged scale, taken along the line 11—11 of FIG. 10.

With reference to FIGS. 1-5, a jacket 10 is constructed by folding a blank 12 of light-weight cardboard and the like to define an interior space 14. The space 14 is enclosed on five sides by a top panel 16 positioned in opposition to a bottom panel 18, and an end panel 20 of narrow width that is connected to the top and bottom panels 16,18 along scored crease or fold lines 22,24. Lateral wings 26 are attached along crease or fold lines 28 to the sides of the top panel 16; lateral wings 30 are attached to the sides of the bottom panel 18 along crease or fold lines 32.

As best illustrated in FIG. 2, when the blank 12 is folded along the crease lines 22, 24 so that the top panel 16 moves into opposition with the bottom panel 18, the lateral wings 26 attached to the side edges of the top panel 16 are folded along the lines 28 to nest within the folded-up lateral wings 30 at the side edges of the bottom panel 18. The width of the wings 26, 30 is such that the top and bottom panels 16, 18 are substantially parallel when the blank 12 is folded and the lateral wings 26 are adhered to the inner side surfaces of the lower lateral wings 30 by means of an adhesive, indicated as dotted surfaces in FIGS. 1 and 2.

A tapered top end flap 34 attaches to the top panel 16 along the fold or crease line 36 and a tapered bottom end flap 38 attaches to the bottom panel 18 along the fold or crease line 40. In an assembled jacket, the end flaps 34, 38 are folded into the inside space 14 of the jacket (FIGS. 2-5) and adhered to the top and bottom panels 16, 18 respectively via an adhesive indicated with dots at 42 on the upper top end flap 34 and at 44 on the bottom end flap 38. The adhesive zones 42,44 are narrow and substantially centered between the fold lines 28, 32.

The end flaps 34, 38 after being folded inwardly along the fold lines 36, 40, respectively, even when the fold lines are scored, have a resilience or memory that tends to draw the flap away from the respective adjacent panel 16, 18. Thereby, a gap 46 opens between the top panel 16 and the trailing edge 48 of the upper tapered flap 34. A similar gap 50 forms between the inner edge 52 of the lower end flap 38 and the bottom panel 18. The gaps 46, 50 are non existent at the centers of the flaps 34, 38 where the adhesive 42, 44 holds the flaps respectively to the top and bottom panels 16, 18. However, the gaps increase in dimension (FIG. 3) as the distance from the centered adhesive increases, the largest gaps being at the points of intersection 54, 56, where the tapered sides of the flaps 34, 38 meet the trailing edges 48, 52, respectively.

A circular opening 58 positioned on the crease 40 in the blank 12 becomes a semi-circular finger access opening 58' when the flap 38 is folded inwardly as illustrated in FIGS. 2-5.

A relatively rigid plastic disc carrier 60 has a planar surface 62 with a recess formed therein. The recess includes a depressed base surface 64, and an intermediate surface 66. The depressed base surface 64 is form in a manner so that one of the surfaces of a compact disc 71 which may be placed in side carrier is completely exposed. An upper rim 68 surrounds the planar sur#ace 62 and recesses 64, 66, except for cutouts 70 that give a person finger access below the edge of a compact disc 71, when the disc is held by flexible fingers 72 that rise from the recessed base 64 to engage the center hole (not shown) of the disc 71. A similar rim 74 surrounds the planar surface 62 from the underside.

As the disc carrier 60 is inserted through the open end of the jacket 10, the rims 68, 74 around the carrier 60 deflect the flaps 34, 38 towards the top panel 16 and bottom panel. 18 respectively, and entry of the carrier is easily accomplished. However, when the disc carrier 60 is withdrawn from the jacket 10, in the direction indicated by the arrow 76, the edges 48, 52 of the flaps 34, 38 snag against, that is, make engagements with, the innermost portions of the rims 68, 74 (FIG. 5) and prevent the carrier 60 from being pulled farther out of the jacket 10. Therefore the jacket 10 does not separate from the carrier 60.

With the carrier 60 extended from the jacket 10, the compact disc 71 is easily removed from or positioned on the fingers 72 within the recess of the carrier 60. Neither the flaps 34, 38 nor the top and bottom panels 16, 18 of the jacket 10 rub on the surface of the compact disc 71 when the jacket and compact disc carrier 60 slide relative to each other because the disc 71 is recessed well below the carrier's planar surface 62 and is further protected by the elevated peripheral rims 68, 74. The central adhesive portions 42, 44 prevent the flaps 34, 38 from unfolding and extending into contact with the disc surface. Moreover, a descriptive brochure may be placed on a compact disc 71. The brochure is sized to fit within the recess 66 and similarly will not interfere with the operation of the carrier.

Thus, an economical, light-weight cardboard jacket, which may be printed on all sides with eye-catching graphics, is provided that adequately protects a compact disc retained on a compact disc carrier. The jacket 10 and carrier 60 do not separate when moved to the open position illustrated in FIG. 4. However, application of lateral pressure on the jacket 10, as indicated by the arrows 78, allows for release of the jacket 10 from the carrier 60 by flexing the jacket panels 16, 18 apart, leaving clearance for the rims 68, 74 to pass freely between the flaps 34, 38.

Many alternative embodiments in accordance with the invention are possible. For example, the flaps 34, 38 need not be tapered, but may be notched so the edges 48, 52 are shorter than the fold lines 36, 40 and fit between the rims 68 that are oriented in the direction 76 of motion. The opening 58 may be omitted, be positioned at the fold line 36 on the upper panel 16, or may be of another shape. An opening 58 may be provided on each panel 16, 18. The surfaces joined with an adhesive in the embodiment described above may be joined by other suitable techniques, for example, thermal bonding, etc. The flaps 34, 38 may be replaced, as described hereinafter, by transverse protrusions extending from the panels 16, 18 or sides 26, 30 into the space 14 so as to engage the carrier rims 68, 74 when the carrier is substantially withdrawn from the jacket.

An alternative embodiment of a jacket 110 and the blank 112 from which it is formed is illustrated in FIGS. 6–11. The jacket 110, as explained hereinafter, is a breakaway portion of a carton 114 comprised of the jacket 110 and a dummy housing 116. Proper folding and gluing (for example) of the blank 112 produces the carton 114 of FIG. 8 that can be separated into its components, the jacket 110 and dummy housing 116, by exertion of a transverse force along a line 118 of die-cut perforations that encircles the carton 114 near its longitudinal mid-section.

As stated, compact discs are relatively small, and flat. Therefore use of an oversized carton 114 when a compact disc is offered for sale has the advantage of increased size, which inhibits concealment and theft of the article from the seller's premises. Promotional material may be provided on the exterior surfaces of the dummy housing as well as on the jacket 110.

The jacket portion of the carton 114 includes a jacket top panel 120, jacket bottom panel 122, and intermediate side panel 124 connected to the top and bottom jacket panels 120, 122 along respective fold lines 126, 127. An end panel 128 connects to the top panel 120 along the fold line 130 and an end panel 132 connects to the jacket bottom panel 122 along the fold line 134. A side panel 136 connects to the jacket bottom panel 122 along the fold line 138 and a tab 140 connects to the side panel 136 along the fold line 141. Tabs 142 at the ends of the side panels 124, 136 provide rigidity and good sealing at the corners when the carton 114 is folded. A semi-circular line 144 of perforations intersects the perforated line 118 in the jacket top panel 120 and in use provides the user with finger access to a carrier within the jacket.

The dummy housing portion of the blank 112 includes a dummy top panel 146, a dummy bottom panel 148 hingedly connected to a side panel 150 along fold lines 151, 152 respectively. An end panel 153 connects to the dummy top panel 146 at the fold line 154 and the end panel 160 connects to the dummy panel 148 along the fold line 158. A side panel 160 connects to the dummy bottom panel 148 along the fold line 161, and tabs 142 are also provided on the side panels 150, 160, as described above.

A zig-zag leaf 162 connects to the side panel 160 of the dummy housing bottom panel 148 along the fold line 163. The leaf 162 includes a central or first doubler 164, a lateral or second doubler 166 connected to side panel 160 along the fold line 163, a first spacer 168 between the doublers 164, 166 and a second spacer 170 located between a tab 172 and the central doubler 164. The second spacer 170 is separated from the tab 172 and the central doubler 164 by a pair of lines 174 that in their solid portions represent die cuts through the blank, and in their broken line portions represent die cut perforations. The first spacer 168 is separated from the central doubler 164 and the second doubler 166 by lines 175 that are similar in construction to the lines 174, described above. A center flap 176, a first side flap 178 and a second side flap 179 are connected along the perforated line 118 to the leaf 162. The flaps 176, 178, 179 are separated along die-cut lines 180 from each other, and from the tab 140.

An adhesive is represented by a dotted surface in the figures. One side of the tab 172 is covered with a layer 182 of adhesive. One side (FIG. 7) of the second doubler 166 is covered with adhesive 184. A strip of adhesive 181 runs along the first doubler 164 and a patch of adhesive 183 covers a central portion of the center flap 176. The tab 140 has adhesive 185 on one surface.

The blank 112 of FIG. 6 is formed into the carton 114 of FIG. 8 by folding the blank illustrated in FIG. 6 along the fold lines 138, 161 and again along the fold lines 141, 163. As indicated (FIG. 7) by the arrow 186, the zig-zag leaf 162 is then folded such that the spacers 168, 170 are perpendicular to the surface of the dummy housing bottom panel 148. The tab 172 is folded inwardly toward the second doubler 166 until the tab 172 is substantially parallel to the dummy housing bottom panel 148. Thus, a two-level structure is formed with the first doubler 164 abutting the dummy housing bottom panel 148 and with the tab 172 and second doubler 166 elevated above the dummy housing bottom panel 148.

Figure 7:
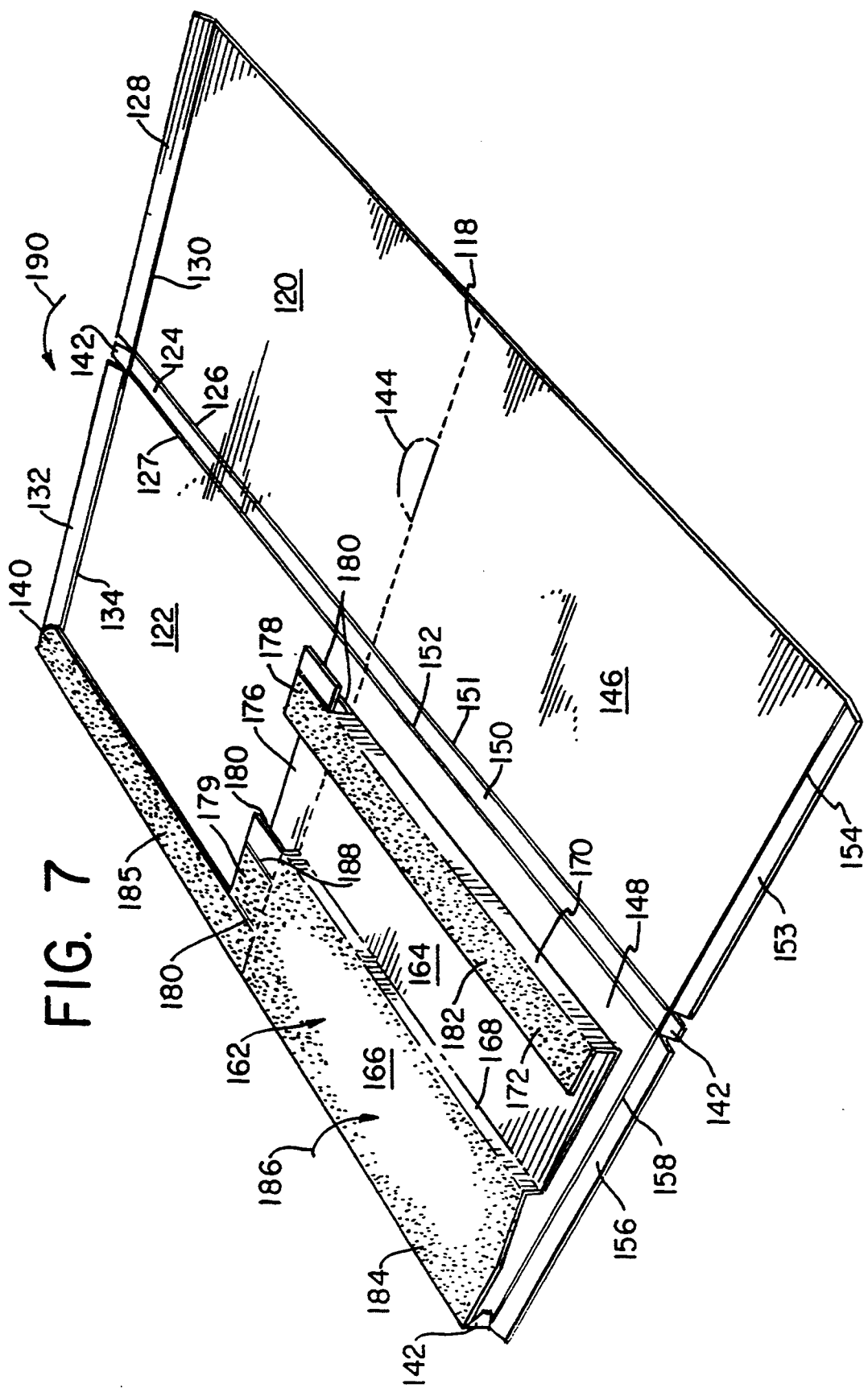
FIG. 7 is a top perspective view of a carton including the modified jacket for a compact disc carrier in accordance with the invention, in a step of assembly from the blank of FIG. 6.

The center flap 176 is at the level of the bottom panels 148, 122 and abuts the surface of the jacket bottom panel 122. The first and second side flaps 178, 179 are elevated above the jacket bottom panel 122 and attached along the perforated line 118 to the tab 172 and second doubler 166, respectively. As illustrated in FIG. 7, the side flaps 178, 179 are each partially covered with adhesive, with a crease line 188 separating the adhesive coated portion from the bear portion. The adhesive strip 181 on the first doubler 164 bonds the first doubler to the dummy housing bottom panel 148, and the adhesive 183 on the center flap 176 bonds the center flap to the jacket bottom panel 122. In this semi-completed state, the segments of the perforated line 118, which will separate the finished jacket 110 from the dummy housing 116, on the panels 120, 122 and on portions of the zig zag leaf 162, are in alignment.

The blank 112 is then folded, in the direction indicated by the arrow 190, along the fold lines 126, 127, 151, 152 until the edge 192 of the blank 112 is in alignment with the folded edges 141, 163 (FIG. 7). The exposed areas 182, 184, 185 of adhesive, that is, the adhesive visible in FIG. 7, are bonded to what are now the inner surfaces of the jacket top panel 120 and the dummy housing top panel 146 to form the carton 114 illustrated in FIG. 8. The end panels 152, 156 at both ends of the carton 114 are conventional, including the tabs 142, and their assembly into the finished product is not described herein. Adhesive (not shown) holds these elements in their assembled condition.

The above description for folding and bonding the elements of the carton 114 together is not intended to indicate that this represents the only sequencing of steps able to produce the carton 114, or is even a preferred sequence. The production details of folding the blank 112 into the completed item 114, including those steps in the procedure when a disc carrier with a compact disc is incorporated into the assembly, are not a portion of this invention and are not described herein.

Nevertheless, when the carton is completely assembled, for sale, a compact disc carrier, the same or similar to that used for the embodiment described above, is included in the carton 114. When the dummy housing 116 is separated from the jacket 110 along the die-cut perforated line 118, the side flaps 178, 179 remain bonded by the adhesive to the inner surface of the jacket top panel 120, and the center flap 176 remains bonded to the jacket bottom panel 122. The portions of the flaps 176, 178, 179 that are not bonded with adhesive to the adjacent surface separate from the adjacent surface, (FIG. 11) due to the fold lines in those flaps, and the general resilient characteristics, that is, memory, of the jacket material.

The disc carrier 60' is similar to the disc carrier 60 except that an upper ledge 194 and a lower ledge 196 extend parallel to each other from the rear 198 of the carrier 60' and parallel to the adjacent jacket surfaces 120, 146. The ledges 194, 196 come in contact with the inwardly extending portions of the flaps 176, 178, 179 when the carrier 60' is pulled from the jacket 110 in the direction of the arrow 200.

The widths 202, 204 of the ledges 194, 196 respectively, determine the position at which an extended carrier 60' is stopped in its outward motion. The widths 202, 204 are selected so that both ledges 194, 196 make contact with a flap simultaneously, although contact with either the lower flap 176 or upper flaps 178, 179 will suffice in preventing separation of the carrier 60' from the jacket 110 when extracting a disc from the carrier 60'. The portion of the carrier 60' that remains within the jacket 110 (FIG. 10) is greater than the portion of the carrier 60 which remains within the jacket 10 (FIG. 5) because of the width of the ledges. A more rigid cantilever-type joint between jacket and carrier is provided in the embodiment of FIG. 10 than in the construction of FIG. 5.

As in the embodiment of FIGS. 1-5, the carrier 60' is releasable from the jacket 110 by application of transverse forces, for example, exerted by a person's fingers, as indicated by the arrows 202. A finger access opening 204 is provided in the jacket by removing the material enclosed between the perforated line 118 and the semi-circular line 144 on the blank 112. The blank can be formed to provide a finger opening on either the top or bottom panel or both panels, or the opening may be omitted.

In another alternative embodiment (FIGS. 12-15) of a jacket 10' in accordance with the invention, the tapering end flaps 34, 38 of FIGS. 1-5 are replaced with flaps 34', 38', respectively, having a rectangular shape with diagonal fold lines 35, 37, respectively, at the free corners.

Figure 12:
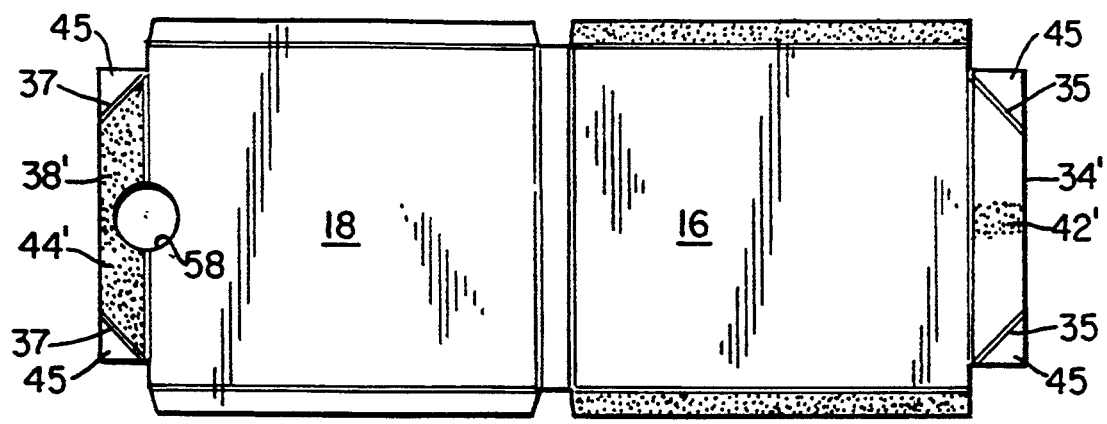
FIG. 12 is a blank from which an alternative embodiment of a jacket for a compact disc carrier in accordance with the invention is fabricated.
Figure 13:
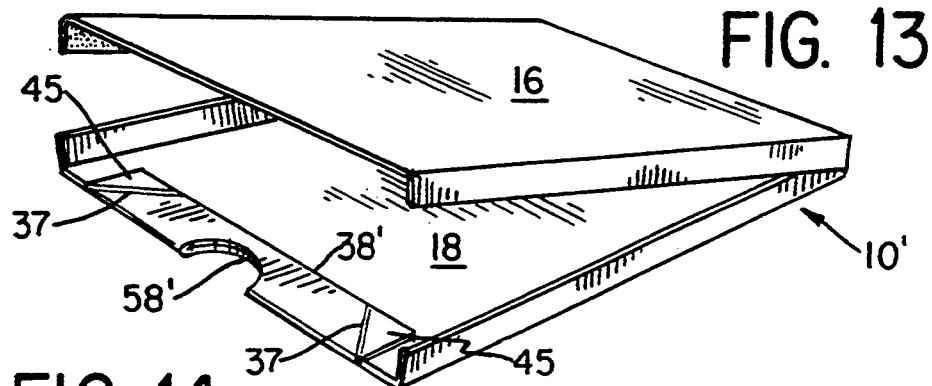
FIG. 13 is a top perspective view of a jacket for a compact disc carrier in accordance with the invention in a step of assembly from the blank of FIG. 12.
Figure 14:
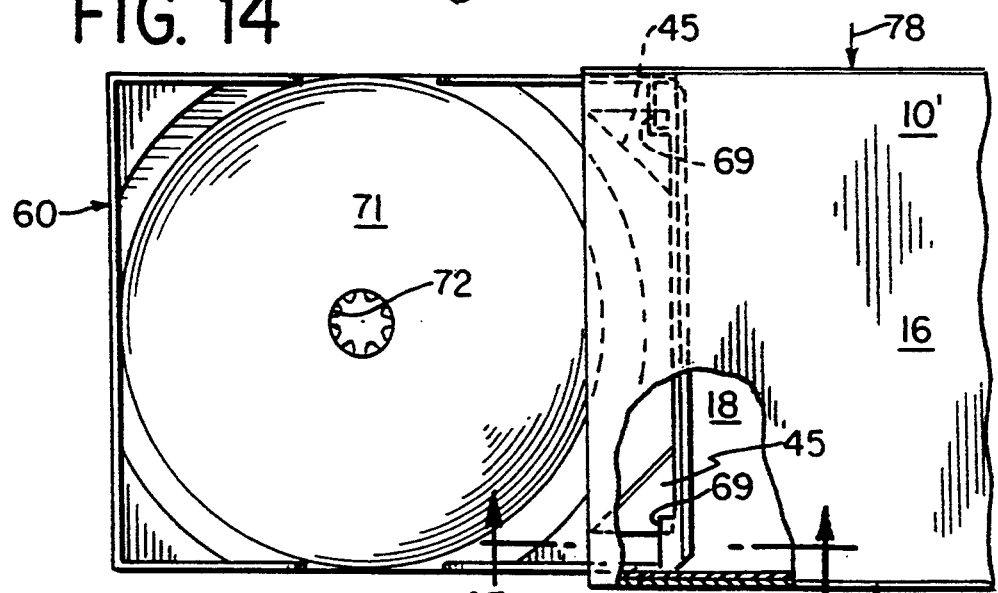
FIG. 14 is a top plan view, partially cut away, of the jacket of FIG. 13 for a compact disc carrier in accordance with the invention showing a compact disc carrier in one operative position.
Figure 15:
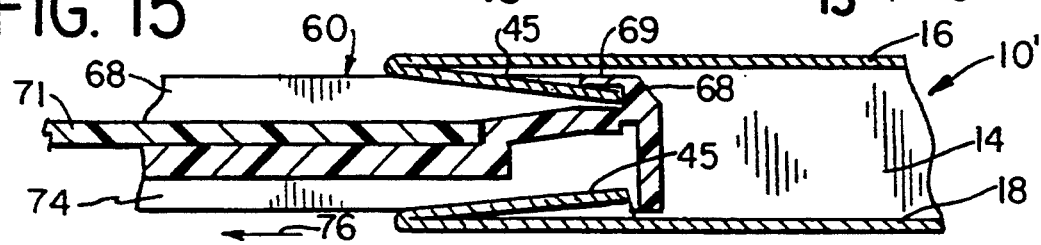
FIG. 15 is a partial sectional view in elevation, to an enlarged scale, taken along the line 15—15 of FIG. 14.

Adhesive 42', 44', illustrated as a dotted surface in FIG. 12, covers the flaps 34', 38' except for the triangular tabs 45, that is, the end portions defined by the fold lines 35, 37. In the completed jacket 10', the tabs 45 are tilted into the space 14 within the jacket, the tabs 45 depending along the fold lines 35, 37 and leaving a gap between the adjacent panels 16, 18.

The other constructional features of the jacket 10' are correspondingly similar to the jacket 10, described above.

When the disc carrier 60 is pulled out of the jacket 10' in the direction indicated by the arrow 76, each tab 45 attached to the top panel 16 of the jacket slips beneath a lip 69 that extends from the upper rim 68 of the carrier 60 at the corners that normally remain within the jacket. This engagement between the carrier 60 and jacket 10' during motion in the outward direction (76) prevents separation of the carrier 60 from the jacket 10' except upon application of transverse forces 78, as described above.

It will thus be seen that the objects set forth above, and those made apparent from the preceding description, are efficiently attained and, since certain changes may be made in the above constructions without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed

1. A container for a compact disc having front and rear surfaces comprising:
    a carrier having length, width, and thickness and including a compartment for receiving and retaining a compact disc in a generally flat-lying position with one of its surfaces completely exposed;
    jacket means defining a generally rectangular space dimensioned for receiving said disc carrier for sliding movement in a direction perpendicular to its thickness, said rectangular space having a forward opening permitting said disc carrier to slide outwardly of said jacket means; and
    retaining means including a first component on said jacket projecting toward said carrier near said forward opening and a second component on said disk carrier projecting in the direction of the thickness thereof toward said jacket near the rear of said disc carrier for preventing, through the engagement of said components, the forward sliding movement of said disc carrier beyond a point at which a portion of the disc remains within said jacket means, but the disc may be tilted in the direction of its thickness and removed from said compartment, said retaining means permitting forward sliding movement of said disc carrier up to that point, whereby said carrier may be slid out of said jacket means for removal of said disc, without exposing the entire disc.

2. A container in accordance with claim 1, wherein one of said components of said retaining means comprises means protruding inwardly into said rectangular space from said jacket means so as to engage a portion of said disc carrier so as to prevent its forward sliding movement.

* * * * *